US009349222B2

(12) United States Patent
Ruszala et al.

(10) Patent No.: US 9,349,222 B2
(45) Date of Patent: May 24, 2016

(54) FOCUSED ILLUMINATED GUIDE FOR CLEARLY IDENTIFYING WHERE A USER SHOULD POSITION A TIME CARD IN A TIME CLOCK TO ASSURE THAT THE TIME CLOCK PROVIDES A PROPERLY POSITIONED PRINTING ON THE TIME CARD

(75) Inventors: Dariusz Ruszala, Roseland, NJ (US); Stephen G. Sardi, Bethany, CT (US)

(73) Assignee: Amano USA Holdings, Inc., Roseland, NJ (US)

( * ) Notice: Subject to any disclaimer, the term of this patent is extended or adjusted under 35 U.S.C. 154(b) by 468 days.

(21) Appl. No.: 13/385,137

(22) Filed: Feb. 3, 2012

(65) Prior Publication Data

US 2013/0201229 A1 Aug. 8, 2013

(51) Int. Cl.
*G01D 15/20* (2006.01)
*G07C 1/06* (2006.01)

(52) U.S. Cl.
CPC .................................... *G07C 1/06* (2013.01)

(58) Field of Classification Search
USPC ..................... 347/2, 118; 346/80–84, 87–88; 235/377; 400/248
See application file for complete search history.

(56) References Cited

U.S. PATENT DOCUMENTS

| | | | | | |
|---|---|---|---|---|---|
| 2,407,020 | A | | 9/1946 | Kraus | |
| 2,971,811 | A | * | 2/1961 | Findlay et al. | 346/86 |
| 3,586,848 | A | * | 6/1971 | Loftis | 362/29 |
| 4,270,043 | A | * | 5/1981 | Baxter et al. | 235/419 |
| 4,394,666 | A | | 7/1983 | Kato | |
| 4,423,315 | A | | 12/1983 | Kato | |
| 4,492,160 | A | * | 1/1985 | Clark et al. | 101/71 |
| 4,494,127 | A | * | 1/1985 | King | 346/82 |
| 4,506,274 | A | * | 3/1985 | Coe | 346/82 |
| 4,510,301 | A | * | 4/1985 | Levy | 526/254 |
| 4,567,357 | A | * | 1/1986 | Fedele | 235/377 |
| 4,831,388 | A | | 5/1989 | Yamanaka | |
| 5,068,787 | A | * | 11/1991 | Pipella et al. | 705/32 |
| 6,061,303 | A | * | 5/2000 | Gauthier et al. | 368/10 |
| 7,265,767 | B2 | | 9/2007 | Forest | |
| 2006/0209100 | A1 | | 9/2006 | Forest | |
| 2006/0209158 | A1 | | 9/2006 | Forest | |

* cited by examiner

*Primary Examiner* — Kristal Feggins

(74) *Attorney, Agent, or Firm* — Charles E. Baxley

(57) ABSTRACT

A time clock clearly identifies where a user should position a time card therein. The clock and a printer platen are fixed relative to a base, and has the time card rests thereon. A printing mechanism moves relative to the base and has a target area, it is traversable between a print position and an idle position, and it impresses the time indicia onto the time card while in the print position. A ribbon shield is fixed relative to the base. A focused illuminated guide is fixed relative to the base, and in combination with the ribbon shield, guides the time card with respect to the printing mechanism to clearly identify where the user should position the time card in the time clock.

35 Claims, 10 Drawing Sheets

FOCUSED ILLUMINATED GUIDE FOR CLEARLY IDENTIFYING WHERE A USER SHOULD POSITION A TIME CARD IN A TIME CLOCK TO ASSURE THAT THE TIME CLOCK PROVIDES A PROPERLY POSITIONED PRINTING ON THE TIME CARD

1. BACKGROUND OF THE INVENTION

A. Field of the Invention

The embodiments of the present invention relate to a time clock, and more particularly, the embodiments of the present invention relate to a focused illuminated guide for clearly identifying where a user should position a time card in a time clock to assure that the time clock provides a properly positioned printing on the time card.

B. Description of the Prior Art

Time clocks are used by businesses to keep track of time worked by hourly employees. To this end, time clocks may be located at entrances or exits of a business. Also, employees may be assigned a time card at the beginning of each week to indicate thereon the time worked by the employee via the time clock.

The time card may have a plurality of time slots for the days of the week, as well as for various times during the day, e.g., start work, start and end of lunch time, and end work. The time clock stamps start and end times of the time worked on respective time slots of the time card.

The time card for each employee may be placed at a central location, adjacent to the time clock. Each employee, when first coming to work at the beginning of the day, may insert the employee's time card into the time clock and depress a print button to actuate a printing mechanism of the time clock to stamp a current time on the time card, thereby indicating the time at which the employee started work.

In particular, when the employee inserts the time card into the time clock, the employee aligns the time slot of the time card to the printing mechanism of the time clock by viewing both the printing mechanism and the time slot of the time card through a print window. The print window, however, may not provide optimal viewing of the time slot of the time card because the time clock cover or internal clock's components shades or blocks any ambient light from the printing mechanism and the time slot of the time card. The only light falling on the printing mechanism and the time slot of the time card is ambient light through the print window or some other general lighting source installed inside of the printer chamber. As a result, the employee may not be able to see whether the appropriate time slot of the time card is aligned to the printing mechanism, and the time card may have a plurality of stamped times that are misaligned to the appropriate time slots of the time card. Hence, an accountant who calculates the time worked by the employee may have difficulty reading the plurality of stamped times on the time card.

Additionally, when the employee looks through the print window, it is sometimes unclear to the employee where the time slot of the time card should be aligned because the employee only sees a plurality of mechanical parts. As such, the employee may misalign the time slot of the time card because the employee does not know what part to align the time slot of the time card with.

Thus, there exists a need for a focused illuminated guide for clearly identifying where a user should position a time card in a time clock to assure that the time clock provides a properly positioned printing on the time card.

Numerous innovations for time clocks and related devices have been provided in the prior art, which will be described below in chronological order to show advancement in the art, and which are incorporated herein in their entirety by reference thereto. Even though these innovations may be suitable for the specific individual purposes to which they address, nevertheless, they differ from the embodiments of the present invention in that they do not teach a focused illuminated guide for clearly identifying where a user should position a time card in a time clock to assure that the time clock provides a properly positioned printing on the time card.

(1) U.S. Pat. No. 2,407,020 to Kraus.

U.S. Pat. No. 2,407,020—issued to Kraus on Sep. 3, 1946 in U.S. class 234 and subclass 43—teaches a time-recording device having a card-receiving slot and an indicator in fixed relation to the recording mechanism, a projection on the indicator, and a guide adapted for being detachably mounted on a card for slidably engaging the projection to position the card endwise when the card is inserted sidewise into the slot.

(2) U.S. Pat. No. 4,394,666 to Kato et al.

U.S. Pat. No. 4,394,666—issued to Kato et al. on Jul. 19, 1983 in U.S. class 346 and subclass 82—teaches a time recorder including a read-out apparatus for reading out a personal code shown on a time card inserted therein, a print line number storage apparatus provided correspondingly to each personal code for storing data expressing a print line number on the time card, a positioning control apparatus for reading out the data from the print line number storage apparatus corresponding to a personal code previously read out at the time of insertion of the time card and for positioning a print line of the time card in conformity with the data, and a data update apparatus for updating data in the print line number storage apparatus in accordance with predetermined criteria.

(3) U.S. Pat. No. 4,423,315 to Kato et al.

U.S. Pat. No. 4,423,315—issued to Kato et al. on Dec. 27, 1983 in U.S. class 235 and subclass 377—teaches a working hour system corresponding to each of a number of different kinds of plural work classes that is stored in the form of predetermined format in a storage section of a time recorder. A time card has a work class code expressing the work class of the person who owns the card. When the time card is inserted into the time recorder, the time recorder first reads out the work class code recorded on the time card, determines the work data related to the time of acceptance of the time card by an arithmetic operation based on the working hour system in a storage section corresponding to the work class code, and prints the results of the arithmetic operation on the time card.

(4) U.S. Pat. No. 4,831,388 to Yamanaka.

U.S. Pat. No. 4,831,388—issued to Yamanaka on May 16, 1989 in U.S. class 346 and subclass 95—teaches an elapsed time recorder including an entrance recorder installed at the entrance for printing the entry time on a time card and simultaneously coding the entry time and printing the coded entry time on the time card, and an exit recorder installed at the exit for printing the exit time on the time card carried to the exit and simultaneously reading the coded entry time recorded on the time card, computing the elapsed time or the difference between the entry time and the exit time, and printing the time difference on the time card.

(5) U.S. Pat. No. 7,265,767 to Forest et al.

Referring now to the figures, in which like numerals indicate like parts, and particularly to FIG. 1, which is a diagrammatic perspective view of a prior art time clock taught by U.S. Pat. No. 7,265,767 to Forest et al., U.S. Pat. No. 7,265,767—issued to Forest et al. on Sep. 4, 2007 in U.S. class 346 and subclass 82—teaches a ribbon shield 20 for a time clock 22 that is placed within a printing chamber 24 of the time clock 22 along with a printing mechanism 26. The ribbon shield 20 of the time clock 22 also incorporates a light source 28, e.g., electroluminescent lamp, to illuminate the printing chamber 24 of the time clock 22 and an inserted time card 30 to aid an employee in aligning a time slot 32 of the time card 30 to a target area 34 of the printing mechanism 26 of the printing chamber 24 of the time clock 22.

(6) United States Patent Application Publication Number 2006/0209100 to Forest et al.

United States Patent Application Publication Number 2006/0209100—published to Forest et al. on Sep. 21, 2006 in U.S. class 347 and subclass 2—teaches a printer cartridge that defines an internal cavity. The cartridge has a body, a cover defining the internal cavity, and a light source that is disposed inside of the internal cavity of the cartridge. The light source shines light through a notch formed in the body to illuminate a time card inserted into a time card time slot of a time clock. The light source also shines light through an arrow shaped aperture to direct an employee that the appropriate time slot of the time card should be aligned under the arrow so that the printing mechanism prints the current time to the aligned time slot.

(7) United States Patent Application Publication Number 2006/0209158 to Forest et al.

United States Patent Application Publication Number 2006/0209158—published to Forest et al. on Sep. 21, 2006 in U.S. class 347 and subclass 118—teaches a ribbon shield for a time clock, which is placed within a printing chamber along with a printing mechanism. The ribbon shield also incorporates a light source, e.g., electroluminescent lamp, to illuminate the printing chamber and an inserted time card to aid an employee in aligning a time slot of the time card to a target area of the printing mechanism.

It is apparent that numerous innovations for time clocks and related devices have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a focused illuminated guide for clearly identifying where a user should position a time card in a time clock to assure that the time clock provides a properly positioned printing on the time card.

2. SUMMARY OF THE INVENTION

Thus, an object of the embodiments of the present invention is to provide a focused illuminated guide for clearly identifying where a user should position a time card in a time clock to assure that the time clock provides a properly positioned printing on the time card, which avoids the disadvantages of the prior art.

Briefly stated, another object of the embodiments of the present invention is to provide a time clock that clearly identifies where a user should position a time card therein to assure that the time clock provides a properly positioned printing on the time card. The time clock includes a base, a clock, a printer platen, a printing mechanism, a ribbon shield, and a focused illuminated guide. The clock is fixed relative to the base. The printer platen is fixed relative to the base, and has the time card rested thereon when time indicia is being indicated on the time card. The printing mechanism moves relative to the base, has a target area, is traversable between a print position and an idle position, impresses the time indicia on the time card while in the print position thereof, and allows the time card to be interposed between the printer platen and the printing mechanism while in the idle position thereof. The ribbon shield is fixed relative to the base, and aids the user in aligning the time card to the target area of the printing mechanism. The focused illuminated guide is fixed relative to the base, and in combination with the ribbon shield, guide the time card with respect to the printing mechanism to clearly identify where the user should position the time card in the time clock to assure that the time clock provides the properly positioned printing on the time card.

The novel features considered characteristic of the embodiments of the present invention are set forth in the appended claims. The embodiments of the present invention themselves, however, both as to their construction and to their method of operation together with additional objects and advantages thereof will be best understood from the following description of the embodiments of the present invention when read and understood in connection with the accompanying figures of the drawing.

3. BRIEF DESCRIPTION OF THE FIGURES OF THE DRAWING

The figures of the drawing are briefly described as follows:

FIG. 1 is a diagrammatic perspective view of a prior art time clock taught by U.S. Pat. No. 7,265,767 to Forest et al.;

4. LIST OF REFERENCE NUMERALS UTILIZED IN THE FIGURES OF THE DRAWING

A. Prior Art

FIG. 1

Figure 1:
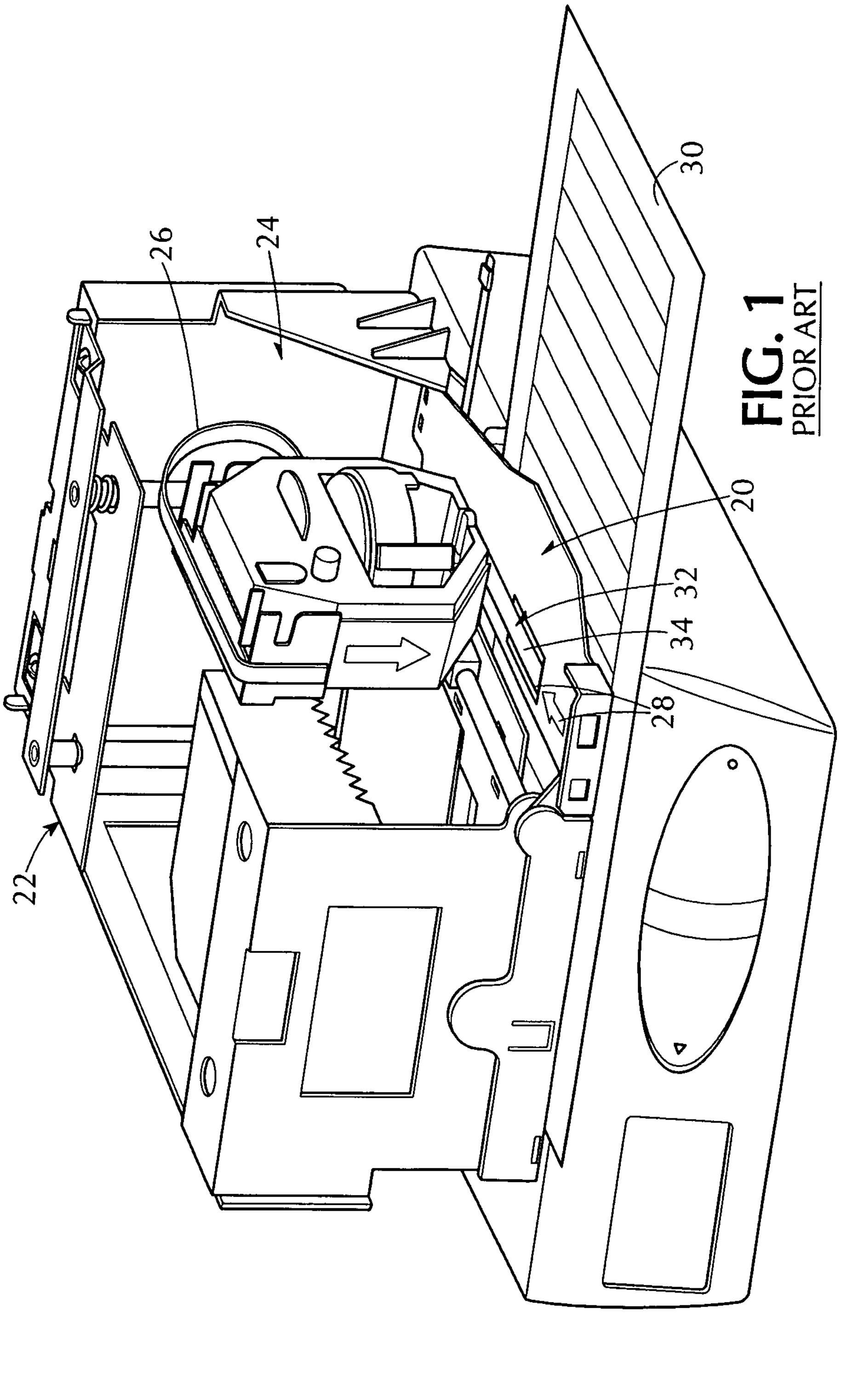
FIG. 1 PRIOR ART

20 ribbon shield of time clock 22
22 time clock

24 printing chamber of time clock 22

26 printing mechanism of printing chamber 24 of time clock 22

28 light source of ribbon shield 20 of time clock 22

30 time card

32 time slot of time card 30

34 target area of printing mechanism 26 of printing chamber 24 of time clock 22

B. Introductory

FIG. 2

40 focused illuminated guide of embodiments of present invention for clearly identifying where user 42 should position time card 44 in time clock 46 to assure that time clock 46 provides properly positioned printing on time card 44, i.e., for guiding time card 44 with respect to printing mechanism 54 for clearly identifying where user 42 should position time card 44 in time clock 46 to assure that time clock 46 provides properly positioned printing on time card 44

42 user

44 time card

46 time clock

47 cover of time clock 46

47*a* print window of cover 47 of time clock 46

C. Overall Configuration of Time Clock 46

FIGS. 3-5

48 base

50 clock

52 printer platen for having time card 44 rested thereon when time indicia is being indicated on time card 44

54 printing mechanism for indicating time indicia on time card 44 and for impressing time indicia on time card 44 while in print position thereof and for allowing time card 44 to be interposed between printer platen 52 and printing mechanism 54 while in idle position thereof

56 ribbon shield for aiding user 42 in aligning time card 44 to target area 58 of printing mechanism 54

58 target area of printing mechanism 54

D. Specific Configuration of Printing Mechanism 54

FIGS. 3-5

60 slot for providing for horizontal maneuverability of time card 44 with respect to printing mechanism 54 but limiting vertical movement of time card 44

64 print head of printing mechanism 54

66 housing of printing mechanism 54

68 ribbon cartridge of printing mechanism 54

70 frame of printing mechanism 54

72 ribbon of ribbon cartridge 68 of printing mechanism 54

E. Specific Configuration of Ribbon Shield 56 and Focused Illuminated Guide 40

FIGS. 6-10

(1) Ribbon Shield 56—FIGS. 6-10.

74 lower surface of ribbon shield 56

76 upper surface of printer platen 52

78 through slot of ribbon shield 56 for framing time slot 32 of time card 44 to assist user 42 in properly aligning time slot 32 of time card 44 to target area 58 of printing mechanism 54

(2) Focused Illuminated Guide 40—FIGS. 6-10.

80 housing of focused illuminated guide 40

82 light source of focused illuminated guide 40 for illuminating only time slot 32 of time card to further assist user 42 in properly aligning time slot 32 of time card 44 to target area 58 of printing mechanism 54

84 printed circuit board of focused illuminated guide 40

86 pointer of focused illuminated guide 40 for being viewed through print window 47*a* of cover 47 of time clock 46 to direct user 42 towards through slot 78 of ribbon shield 56 and thereby still further assist user 42 in properly aligning time slot 32 of time card 44 to target area 58 of printing mechanism 54

5. DETAILED DESCRIPTION OF THE PREFERRED EMBODIMENTS

A. Introductory

Figure 2:
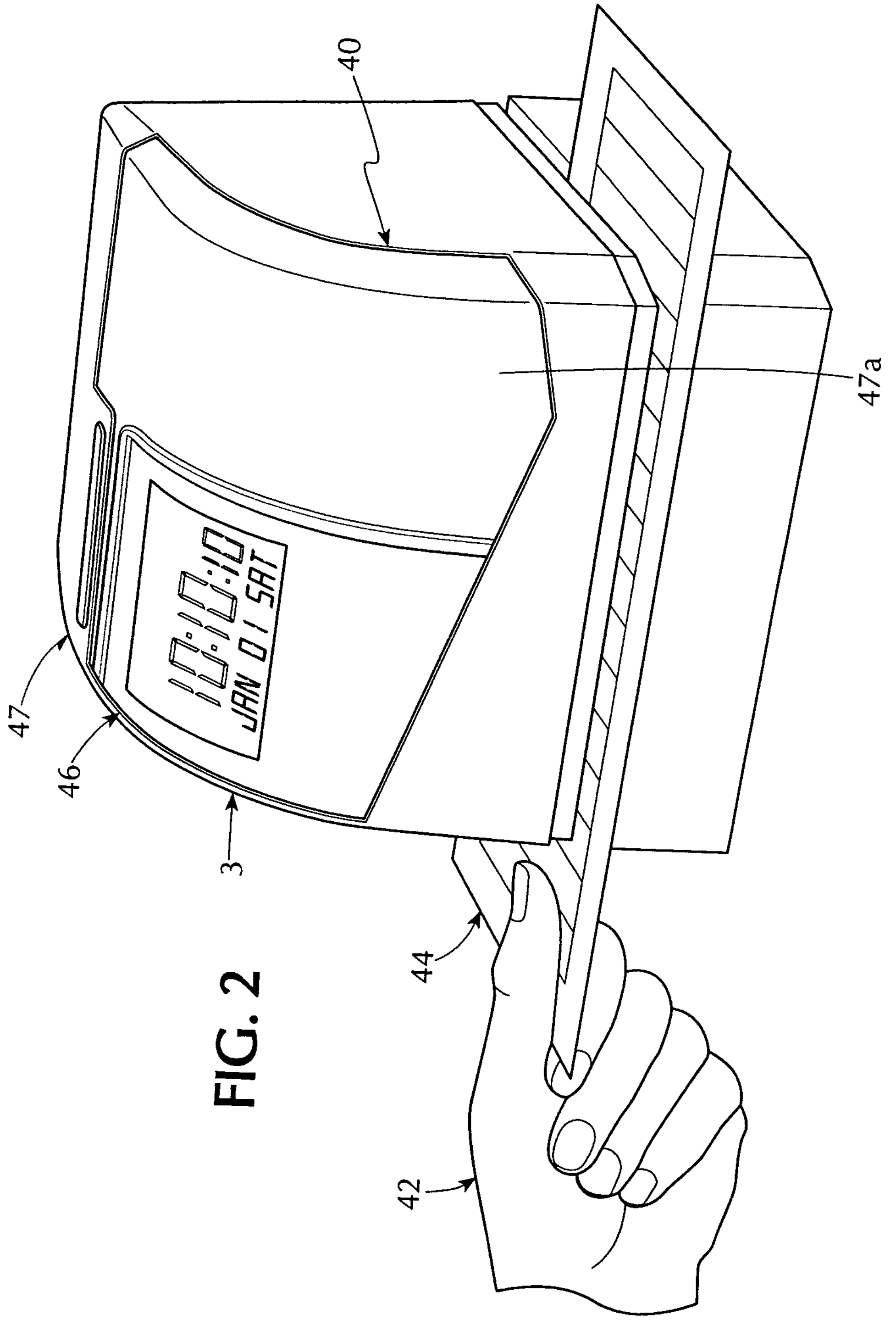
FIG. 2 is a diagrammatic perspective view of the focused illuminated guide of the embodiments of the present invention clearly identifying where a user should position a time card in a time clock to assure that the time clock provides a properly positioned printing on the time card.

Referring now to FIG. 2, which is a diagrammatic perspective view of the focused illuminated guide of the embodiments of the present invention clearly identifying where a user should position a time card in a time clock to assure that the time clock provides a properly positioned printing on the time card, the focused illuminated guide of the embodiments of the present invention is shown generally at 40 for clearly identifying where a user 42 should position a time card 44 in a time clock 46 to assure that the time clock 46 provides a properly positioned printing on the time card 44. The time clock 46 has a cover 47 with a print window 47*a*.

B. Overall Configuration of the Time Clock 46

Figure 3:
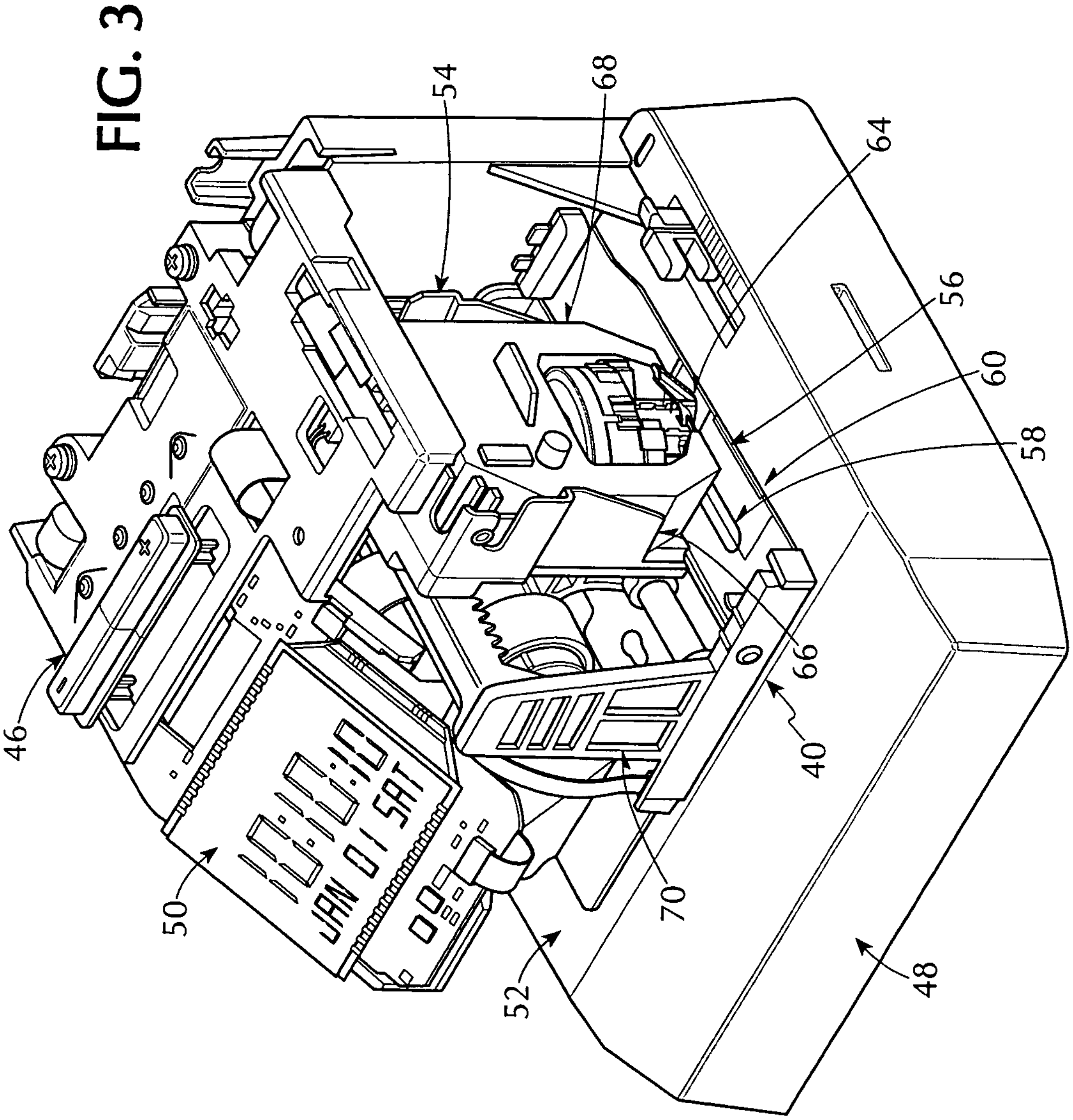
FIG. 3 is an enlarged diagrammatic perspective view of the time clock identified by ARROW 3 in FIG. 2 but with the cover thereof removed.
Figure 4:
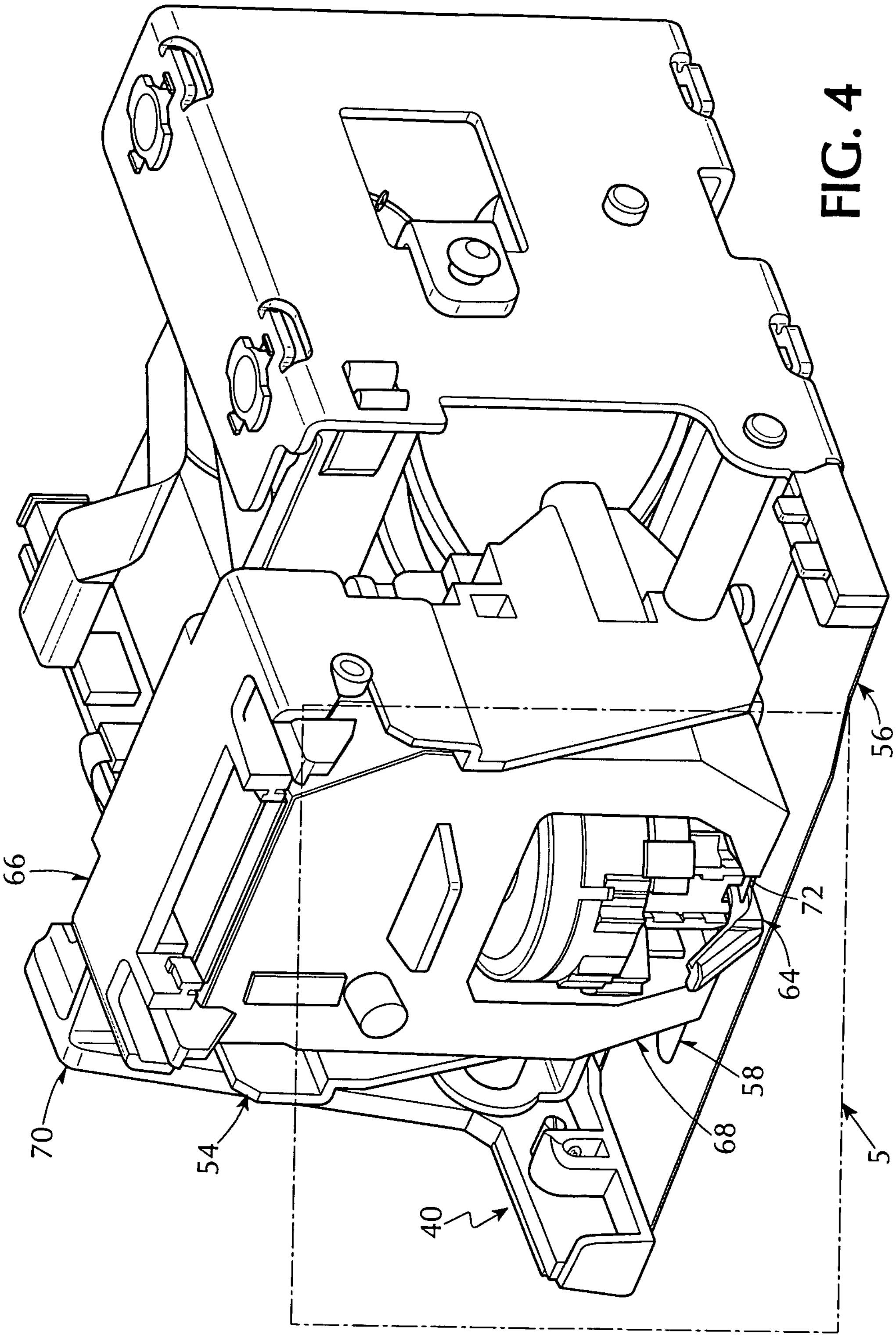
FIG. 4 is an enlarged diagrammatic perspective view of the time clock shown in FIG. 3 but with the base, the clock, and the printer platen thereof removed.
Figure 5:
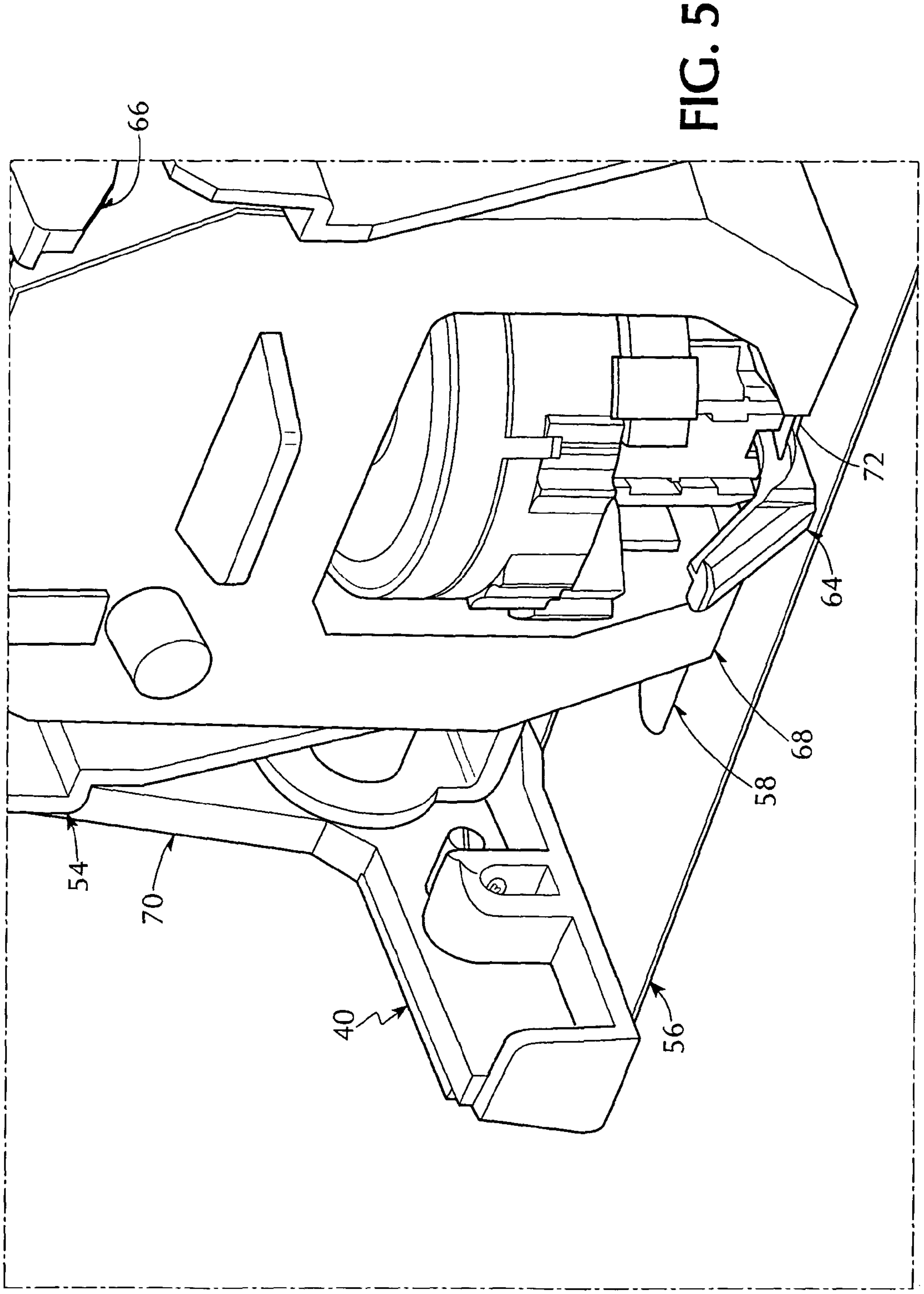
FIG. 5 is an enlarged diagrammatic perspective view of the area generally enclosed by the dotted curve identified by ARROW 5 in FIG. 4.

The overall configuration of the time clock 46 can best be seen in FIGS. 3-5, which are, respectively, an enlarged diagrammatic perspective view of the time clock identified by ARROW 3 in FIG. 2 but with the cover thereof removed, an enlarged diagrammatic perspective view of the time clock shown in FIG. 3 but with the base, the clock, and the printer platen thereof removed, and an enlarged diagrammatic perspective view of the area generally enclosed by the dotted curve identified by ARROW 5 in FIG. 4, and as such, will be discussed with reference thereto.

The time clock 46 comprises a base 48, a clock 50, a printer platen 52, a printing mechanism 54, a ribbon shield 56, and the focused illuminated guide 40.

The clock 50 is fixed relative to the base 48.

The printer platen 52 is fixed relative to the base 48, and is for having the time card 44 rested thereon when time indicia is being indicated on the time card 44.

The printing mechanism 54 moves relative to the base 48, has a target area 58, is traversable between a print position and an idle position, and is for impressing the time indicia on the time card 44 while in the print position thereof and for allowing the time card 44 to be interposed between the printer platen 52 and the printing mechanism 54 while in the idle position thereof.

The ribbon shield 56 is fixed relative to the base 48, and is for aiding the user 42 in aligning the time card 44 to the target area 58 of the printing mechanism 54.

The focused illuminated guide 40 is fixed relative to the base 48, and in combination with the ribbon shield 56, is for guiding the time card 44 with respect to the printing mechanism 54 for clearly identifying where the user 42 should position the time card 44 in the time clock 46 to assure that the time clock 46 provides the properly positioned printing on the time card 44.

C. Specific Configuration of the Printing Mechanism 54

The printer platen 52 and the printing mechanism 54 work in conjunction with each other for imprinting a time indicated by the clock 50 onto the time card 44.

For example, the user 42 at the beginning of a work day inserts the time card 44 into a slot 60 formed between the printer platen 52 and the ribbon shield 56, and aligns a time slot 32 of the time card 44 to the target area 58 of the printing mechanism 54. Once the time slot 32 of the time card 44 is aligned to the printing mechanism 54, the printing mechanism 54 is activated and prints a time indicated on the clock 50 onto the time card 44 at the time slot 32 of the time card 44 via a print head 64 of the printing mechanism 54 moving downwardly to imprint the time onto the time card 44. Throughout the day, the user 42 stamps the time card 44 via the time clock 46 to indicate when the user 42 started his/her lunch/break, ended his/her lunch/break, and ended work.

The printing mechanism 54 includes a housing 66, a ribbon cartridge 68, and the print head 64. The ribbon cartridge 68 of the printing mechanism 54 is removably attached to the housing 66 of the printing mechanism 54. The housing 66 of the printing mechanism 54 is attached to a frame 70 of the printing mechanism 54, along with the print head 64 of the printing mechanism 54. The housing 66 of the printing mechanism 54, the ribbon cartridge 68 of the printing mechanism 54, and the print head 64 of the printing mechanism 54 move forward, and the print head 64 of the printing mechanism 54 moves downwardly onto a ribbon 72 of the ribbon cartridge 68 of the printing mechanism 54 to indicate the time onto the time card 44.

D. Specific Configuration of the Ribbon Shield 56 and the Focused Illuminated Guide 40

Figure 6:
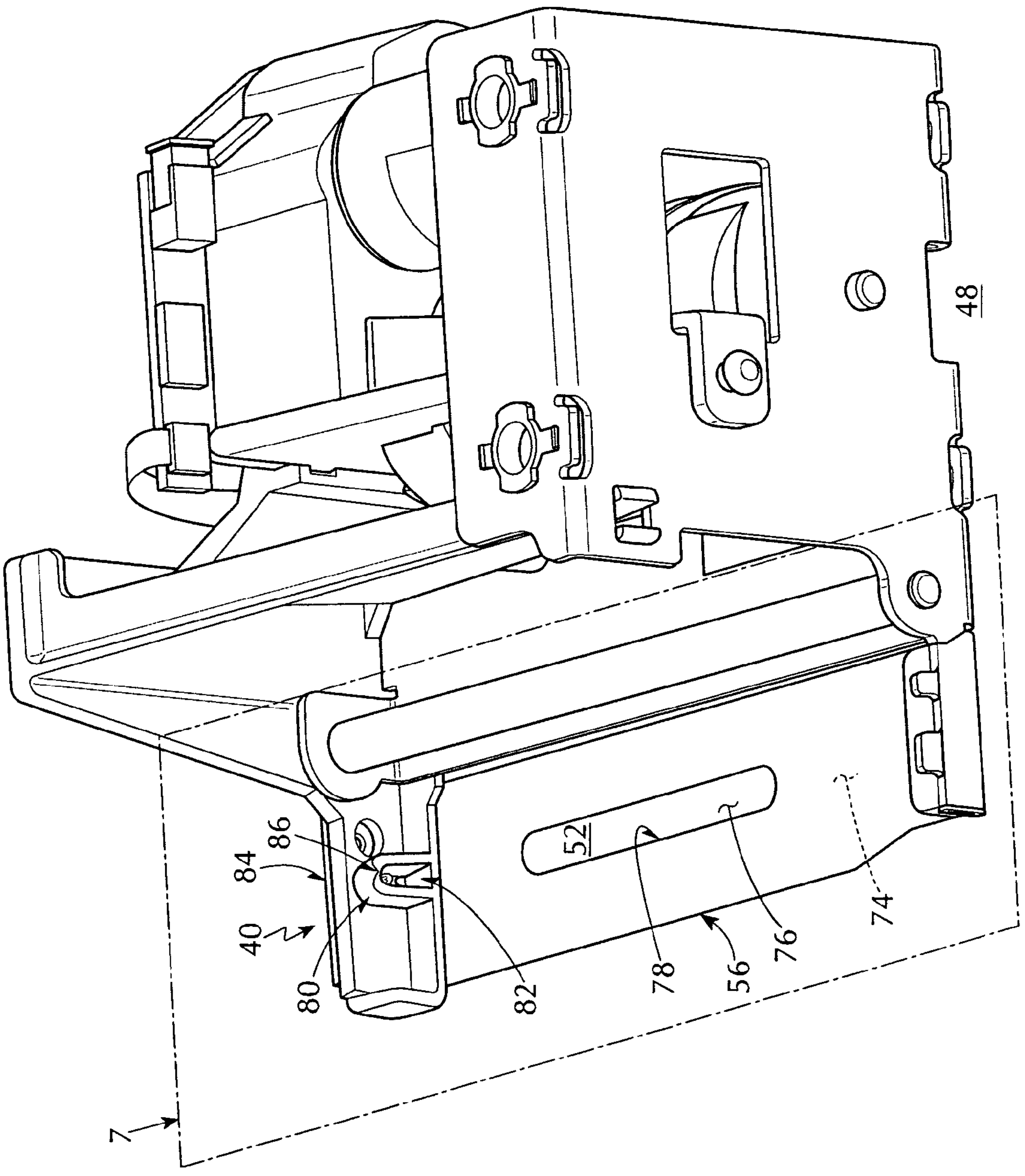
FIG. 6 is an enlarged diagrammatic perspective view of the time clock shown in FIG. 4 but with the base, the clock, the printer platen, and the printing mechanism thereof removed.
Figure 7:
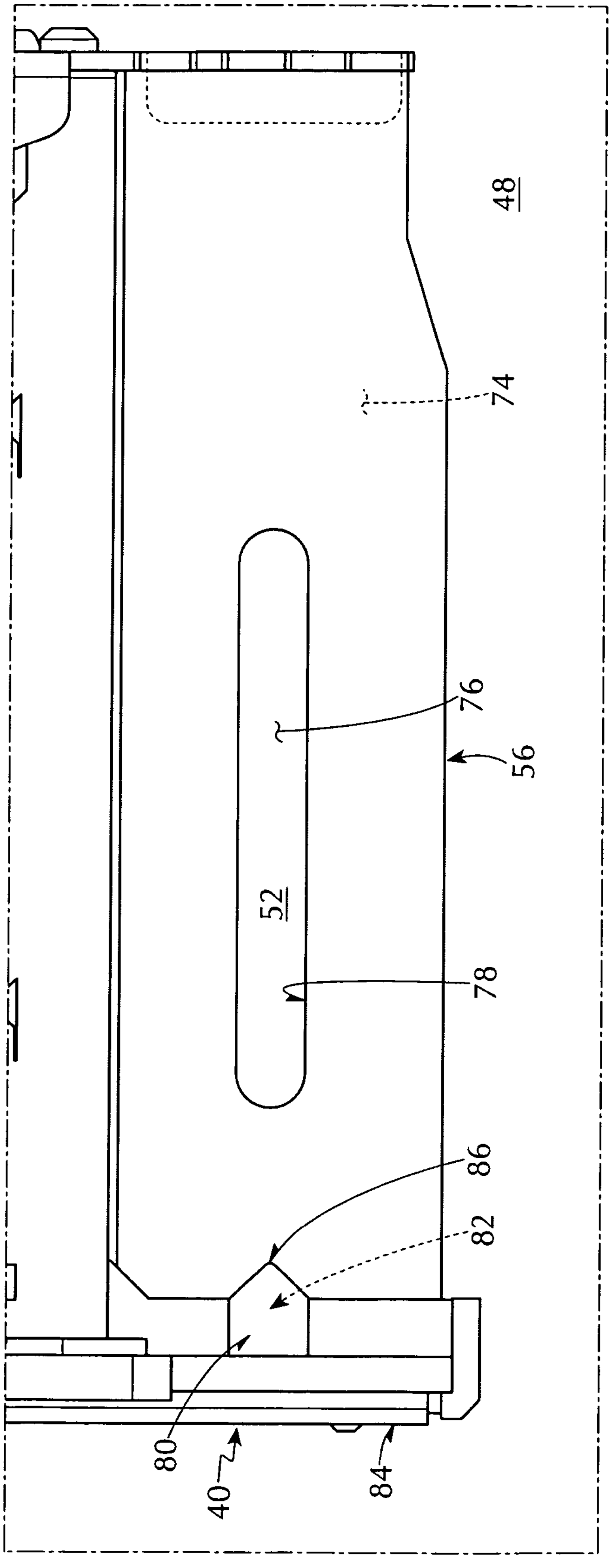
FIG. 7 is an enlarged diagrammatic top plan view of the area generally enclosed by the dotted curve identified by ARROW 7 in FIG. 6 of the ribbon shield and the focused illuminated guide of the embodiments of the present invention not illuminated.
Figure 8:
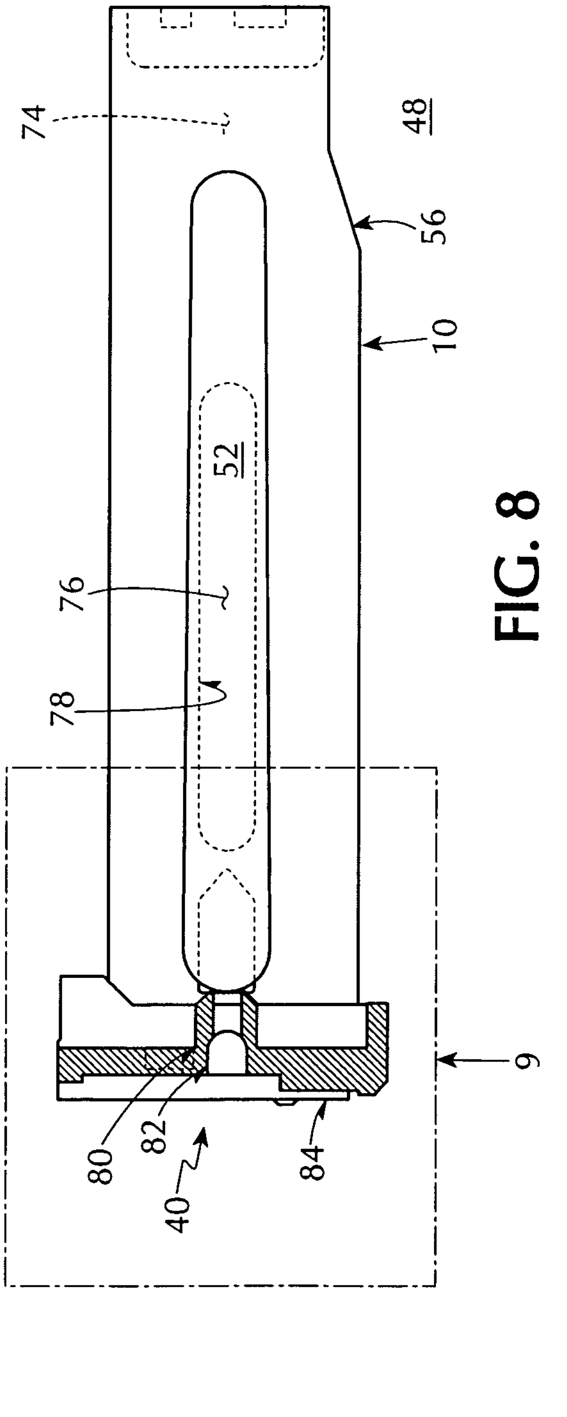
FIG. 8 is a reduced diagrammatic top plan view of the ribbon shield and the focused illuminated guide of the embodiments of the present invention shown in FIG. 7 but with the focused illuminated guide of the embodiments of the present invention illuminated.
Figure 9:
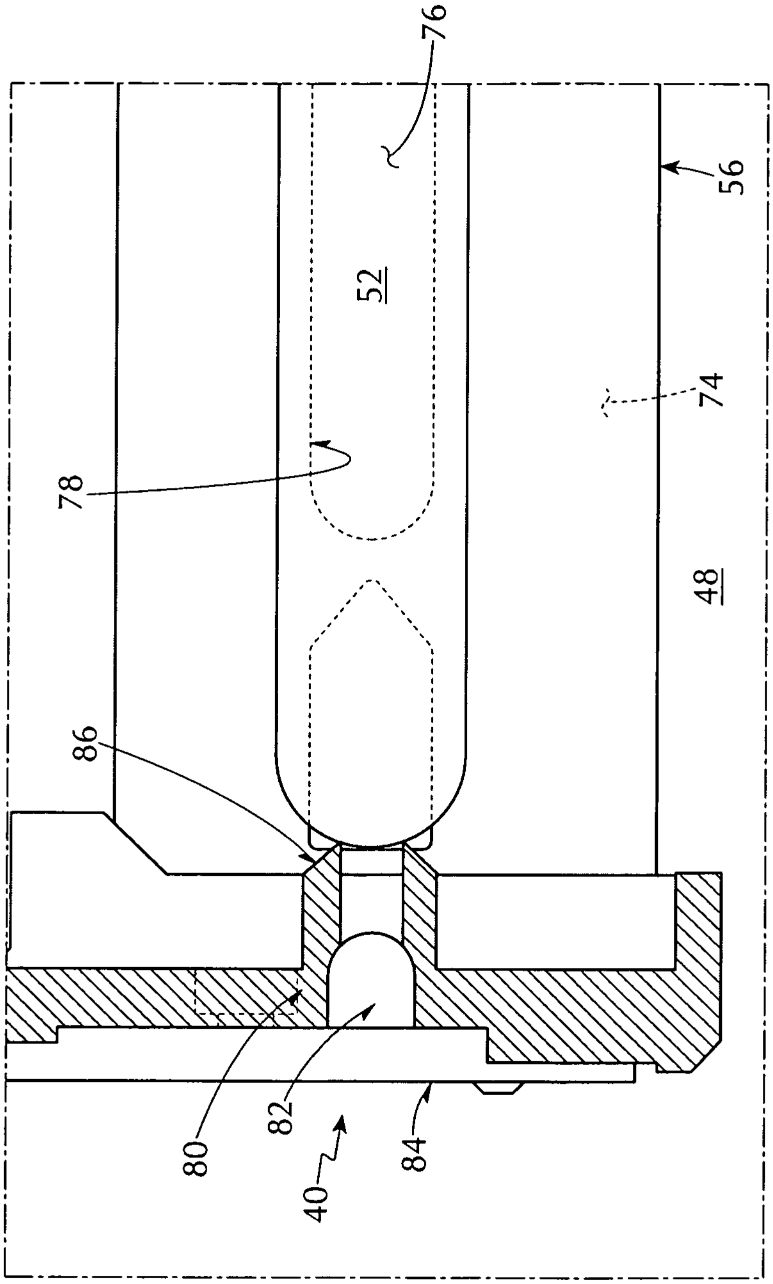
FIG. 9 is an enlarged diagrammatic top plan view of the area generally enclosed by the dotted curve identified by ARROW 9 in FIG. 8.
Figure 10:
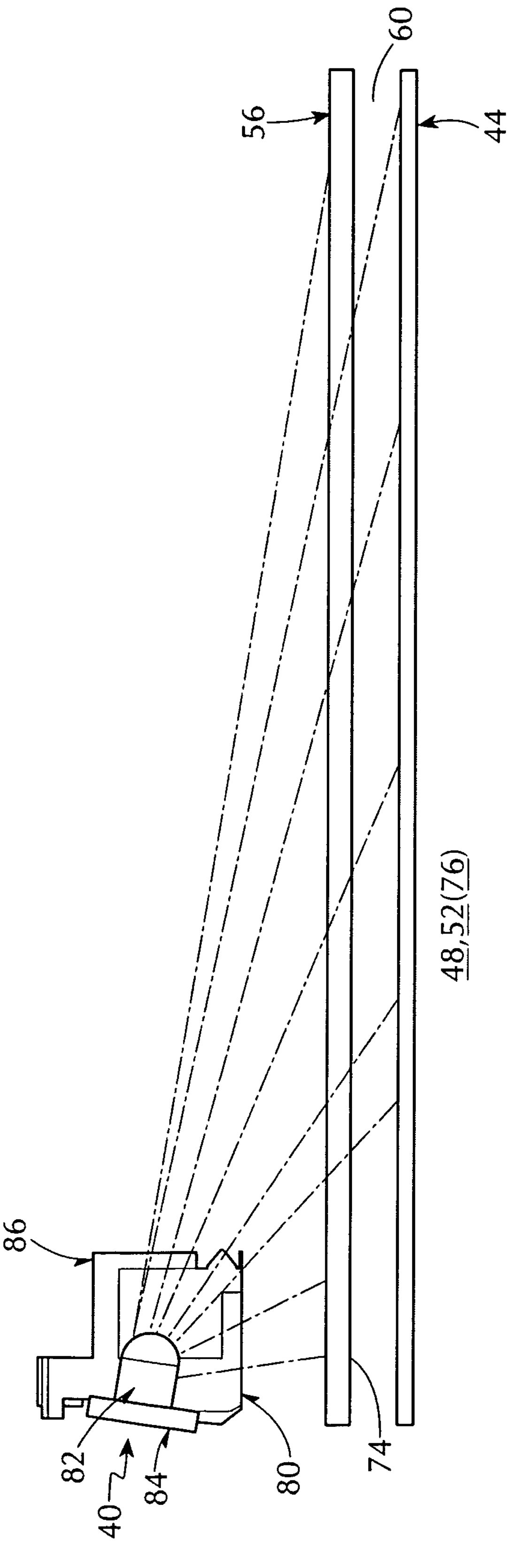
FIG. 10 is a reduced diagrammatic side elevational view taken generally in the direction of ARROW 10 in FIG. 8 but with a time card disposed between the ribbon shield and the printer platen.

The specific configuration of the ribbon shield 56 and the focused illuminated guide 40 can best be seen in FIGS. 6-10, which are, respectively, an enlarged diagrammatic perspective view of the time clock shown in FIG. 4 but with the base, the clock, the printer platen, and the printing mechanism thereof removed, an enlarged diagrammatic top plan view of the area generally enclosed by the dotted curve identified by ARROW 7 in FIG. 6 of the ribbon shield and the focused illuminated guide of the embodiments of the present invention not illuminated, a reduced diagrammatic top plan view of the ribbon shield and the focused illuminated guide of the embodiments of the present invention shown in FIG. 7 but with the focused illuminated guide of the embodiments of the present invention illuminated, an enlarged diagrammatic top plan view of the area generally enclosed by the dotted curve identified by ARROW 9 in FIG. 8, and a reduced diagrammatic side elevational view taken generally in the direction of ARROW 10 in FIG. 8 but with a time card disposed between the ribbon shield and the printer platen, and as such, will be discussed with reference thereto.

(1) Ribbon Shield 56.

The ribbon shield 56 has a sheet configuration.

The ribbon shield 56, when attached to the base 48, is substantially parallel to the printer platen 52.

A lower surface 74 of the ribbon shield 56 and an upper surface 76 of the printer platen 52 define the slot 60. The slot 60 is for providing for horizontal maneuverability of the time card 44 with respect to the printing mechanism 54, but limiting vertical movement of the time card 44.

The ribbon shield 56 has a through slot 78. The through slot 78 of the ribbon shield 56 is axially disposed, slender, elongated, is below, and allows, the print head 64 to pass therethrough for indicating the time on the time slot 32 of the time card 44, and is for framing the time slot 32 of the time card 44 to assist the user 42 in properly aligning the time slot 32 of the time card 44 with the target area 58 of the printing mechanism 54.

The ribbon shield 56 is made of a light-absorbing material for further aiding the user 42 in aligning the time slot 32 of the time card 44 with the printing mechanism 54 by absorbing light outside of the through slot 78 of the ribbon shield 56 so as to allow the user 42 to clearly see mainly the time slot 32 of the time card 44.

(2) Focused Illuminated Guide 40.

The focused illuminated guide 40 is for facilitating alignment of the time slot 32 of the time card 44 to the target area 58 of the printing mechanism 54.

The focused illuminated guide 40 comprises a housing 80. The housing 80 of the focused illuminated guide 40 is spaced just above the ribbon shield 56, and is disposed in front of the through slot 78 of the ribbon shield 56.

The focused illuminated guide 40 further comprises a light source 82. The light source 82 of the focused illuminated guide 40 is positioned in the housing 80 of the focused illuminated guide 40, above the ribbon shield 56—and thereby above the time card 44—and is positioned in front of, slanted downwardly towards, and focused only on, the through slot 78 of the ribbon shield 56—and not general lighting of the printing chamber 24 of the time clock 22—for illuminating only the time slot 32 of the time card 44 to further assist the user 42 in properly aligning the time slot 32 of the time card 44 to the target area 58 of the printing mechanism 54 by providing a focused light path that illuminates the target area 58 of the printing mechanism 54 (at least FIGS. 8-10).

The printing mechanism 54 is moved out of the way so as to allow only the time slot 32 of the time card 44 to be illuminated by the light source 82 of the focused illuminated guide 40 so as to be viewed through the print window 47*a* of the cover 47 of the time clock 46 when the printing mechanism 54 is in the idle position thereof.

The printing mechanism 54 is moved toward the time card 44 and imprints a current time onto the time slot 32 of the time card 44 when the printing mechanism 54 is in the print position thereof.

The light source 82 of the focused illuminated guide 40 is at least one of either at least one LED, at least one laser diode, a least one electroluminescent lamp, at least one light pipe, combinations thereof, or the like.

The focused illuminated guide 40 further comprises a printed circuit board 84. The printed circuit board 84 of the focused illuminated guide 40 has the light source 82 of the focused illuminated guide 40 mounted thereto.

The focused illuminated guide 40 further comprises a pointer 86. The pointer 86 of the focused illuminated guide 40 is disposed above the light source 82 of the focused illuminated guide 40, and is for being viewed through the print window 47*a* of the cover 47 of the time clock 46 to direct the user 42 towards the through slot 78 of the ribbon shield 56 and thereby still further assist the user 42 in properly aligning the time slot 32 of the time card 44 to the target area 58 of the printing mechanism 54 (at least FIGS. 8 and 9).

E. Impressions

It will be understood that each of the elements described above or two or more together may also find a useful application in other types of constructions differing from the types described above.

While the embodiments of the present invention have been illustrated and described as embodied in a focused illuminated guide for clearly identifying where a user should position a time card in a time clock to assure that the time clock provides a properly positioned printing on the time card, nevertheless, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A time clock for clearly identifying where a user should position a time card therein to assure that the time clock provides a properly positioned printing on the time card, comprising:

a) a base b) a clock;

c) a printer platen;

d) a printing mechanism;

e) a ribbon shield; and a focused illuminated guide;

f) wherein said clock is fixed relative to said base;

wherein said printer platen is fixed relative to said base;

wherein said printer platen is for having the time card rested thereon when time indicia is being indicated on the time card;

wherein said printing mechanism moves relative to said base;

wherein said printing mechanism has a target area;

wherein said printing mechanism is traversable between a print position and an idle position;

wherein said printing mechanism is for impressing the time indicia on the time card while in said print position thereof;

wherein said printing mechanism is for allowing the time card to be interposed between said printer platen and said printing mechanism when in said idle position thereof;

wherein said ribbon shield is fixed relative to said base;

wherein said ribbon shield is for aiding the user in aligning the time card to said target area of said printing mechanism;

wherein said focused illuminated guide is fixed relative to said base;

wherein said focused illuminated guide, in combination with said ribbon shield, is for guiding the time card with respect to said printing mechanism for clearly identifying where the user should position the time card in said time clock to assure that said time clock provides the properly positioned printing on the time card;

wherein said ribbon shield has a through slot;

wherein said through slot of said ribbon shield is for allowing said print head to pass therethrough and indicate the time on the time card; and wherein said ribbon shield is made of a light-absorbing material for aiding the user in aligning the time slot of the time card with said printing mechanism by absorbing light outside of said through slot of said ribbon shield so as to allow the user to clearly see mainly the time slot of the time card.

2. The time clock of claim 1, wherein said ribbon shield has a sheet configuration.

3. The time clock of claim 1, wherein said ribbon shield, when attached to said base, is substantially parallel to said printer platen.

4. The time clock of claim 1, wherein said ribbon shield has a lower surface;

wherein said printer platen has an upper surface;

wherein said lower surface of said ribbon shield and said upper surface of said printer platen define a slot; and wherein said slot is for providing for horizontal maneuverability of the time card with respect to said printing mechanism, but limiting vertical movement of the time card.

5. The time clock of claim 1, wherein said through slot of said ribbon shield is axially disposed;

wherein said through slot of said ribbon shield is slender; and wherein said through slot of said ribbon shield is elongated.

6. The time clock of claim 1, wherein said focused illuminated guide comprises a housing.

7. The time clock of claim 6, wherein said housing of said focused illuminated guide is spaced just above said ribbon shield; and wherein said housing of said focused illuminated guide is disposed in front of said through slot of said ribbon shield.

8. The time clock of claim 6, wherein said focused illuminated guide comprises a light source.

9. The time clock of claim 8, wherein said light source of said focused illuminated guide is positioned in said housing of said focused illuminated guide; and wherein said light source of said focused illuminated guide is positioned above said ribbon shield, and thereby above the time card, and is positioned in front of, slanted downwardly towards, and focused only on, said through slot of said ribbon shield, and not general lighting of a printing chamber, for illuminating only the time slot of the time card to assist the user in properly aligning the time slot of the time card to said target area of said printing mechanism by providing a focused light path that illuminates said target area of said printing mechanism.

10. The time clock of claim 8, wherein said printing mechanism is moved out of the way so as to allow only the time slot of the time card to be illuminated by said light source of said focused illuminated guide so as to be viewed through a print window of a cover of said time clock when said printing mechanism is in said idle position thereof.

11. The time clock of claim 10, wherein said focused illuminated guide comprises a pointer.

12. The time clock of claim 11, wherein said pointer of said focused illuminated guide is disposed above said light source of said focused illuminated guide; and wherein said pointer of said focused illuminated guide is for being viewed through said print window of said cover of said time clock to direct the user towards said through slot of said ribbon shield and thereby assist the user in properly aligning the time slot of the time card to said target area of said printing mechanism.

13. The time clock of claim 8, wherein said light source of said focused illuminated guide is selected from the group consisting of at least one LED, at least one laser diode, a least one electroluminescent lamp, at least one light pipe, and combinations thereof.

14. The time clock of claim 8, wherein said focused illuminated guide comprises a printed circuit board.

15. The time clock of claim 14, wherein said printed circuit board of said focused illuminated guide has the light source of the focused illuminated guide mounted thereto.

16. An improved time clock clearly identifying where a user should position a time card therein to assure that the time clock provides a properly positioned printing on the time card, and being of the type having a base, a clock, a printer platen, a printing mechanism, a ribbon shield, and a light, wherein the clock is fixed relative to the base, wherein the printer platen is fixed relative to the base and has the time card rested thereon when time indicia is being indicated on the time card, wherein the printing mechanism moves relative to the base, has a target area, traverses between a print position and an idle position, impresses the time indicia on the time card while in the print position thereof and allows the time card to be interposed between the printer platen and the printing mechanism when in the idle position thereof, wherein the ribbon shield is fixed relative to the base and has a through slot, and wherein said improvement comprises:

a) the ribbon shield aiding the user in aligning the time card to the target area of the printing mechanism;
b) the light being a focused illuminated guide;
c) said focused illuminated guide being fixed relative to the base;
d) said focused illuminated guide, in combination with the ribbon shield, guiding the time card with respect to the printing mechanism to clearly identify where the user should position the time card in the time clock to assure that the time clock provides the properly positioned printing on the time card; and
e) the ribbon shield being made of a light-absorbing material to aid the user in aligning the time slot of the time card with the printing mechanism by absorbing light outside of the through slot of the ribbon shield so as to allow the user to clearly see mainly the time slot of the time card.

17. The improved time clock of claim 16, wherein said improvement comprises said focused illuminated guide comprising a housing.

18. The improved time clock of claim 17, wherein said improvement comprises:

a) said housing of said focused illuminated guide being spaced just above the ribbon shield; and
b) said housing of said focused illuminated guide being disposed in front of the through slot of the ribbon shield.

19. The improved time clock of claim 17, wherein said improvement comprises said focused illuminated guide comprising a light source.

20. The improved time clock of claim 19, wherein said improvement comprises:

a) said light source of said focused illuminated guide being positioned in said housing of said focused illuminated guide; and
b) said light source of said focused illuminated guide being positioned above the ribbon shield and thereby above the time card, and being positioned in front of, slanted downwardly towards, and focused only on, the through slot of the ribbon shield, and not general lighting of a printing chamber, for illuminating only the time slot of the time card to assist the user in properly aligning the time slot of the time card to the target area of the printing mechanism by providing a focused light path that illuminates the target area of the printing mechanism.

21. The improved time clock of claim 19, wherein said improvement comprises said light source of said focused illuminated guide being selected from the group consisting of at least one LED, at least one laser diode, a least one electroluminescent lamp, at least one light pipe, and combinations thereof.

22. The improved time clock of claim 19, wherein said improvement comprises said focused illuminated guide comprising a printed circuit board.

23. The improved time clock of claim 22, wherein said improvement comprises said printed circuit board of said focused illuminated guide having said light source of said focused illuminated guide mounted thereto.

24. The improved time clock of claim 19, wherein said improvement comprises said focused illuminated guide comprising a pointer.

25. The improved time clock of claim 24, wherein said improvement comprises:

a) said pointer of said focused illuminated guide being disposed above said light source of said focused illuminated guide; and
b) said pointer of said focused illuminated guide being viewed through a print window of a cover of the time clock to direct the user towards the through slot of the ribbon shield and thereby assist the user in properly aligning the time slot of the time card to the target area of the printing mechanism.

26. A device for clearly identifying where a user should position a time card in a time clock to assure that the time clock provides a properly positioned printing on the time card, comprising:

a) a ribbon shield; and
b) a focused illuminated guide;

wherein said focused illuminated guide, in combination with said ribbon shield, guide the time card with respect to a printing mechanism of the time clock to clearly identify where the user should position the time card in the time clock to assure that the time clock provides the properly positioned printing on the time card; and wherein said ribbon shield is made of a light-absorbing material to aid the user in aligning the time slot of the time card with the printing mechanism by absorbing light outside of a through slot of said ribbon shield so as to allow the user to clearly see mainly the time slot of the time card.

27. The device of claim 26, wherein said focused illuminated guide comprises a housing.

28. The device of claim 27, wherein said housing of said focused illuminated guide is spaced just above said ribbon shield; and wherein said housing of said focused illuminated guide is positioned in front of said through slot of said ribbon shield.

29. The device of claim 27, wherein said focused illuminated guide comprises a light source.

30. The device of claim 29, wherein said light source of said focused illuminated guide is positioned in said housing of said focused illuminated guide; and wherein said light source of said focused illuminated guide is positioned above said ribbon shield and thereby above the time card and is positioned in front of, slanted downwardly towards, and focused only on, said through slot of said ribbon shield, and not general lighting of a printing chamber, for illuminating only the time slot of the time card to assist the user in properly aligning the time slot of the time card to a target area of a printing mechanism by providing a focused light path that illuminates the target area of the printing mechanism.

31. The device of claim 29, wherein said focused illuminated guide comprises a printed circuit board.

32. The device of claim 31, wherein said printed circuit board of said focused illuminated guide has said light source of said focused illuminated guide mounted thereto.

33. The device of claim 30, wherein said focused illuminated guide comprises a pointer.

34. The device of claim 33, wherein said pointer of said focused illuminated guide is disposed above said light source of said focused illuminated guide; and wherein said pointer of said focused illuminated guide is viewed through a print window of a cover of the time clock to direct the user towards said through slot of said ribbon shield and thereby assist the user in properly aligning the time slot of the time card to the target area of the printing mechanism.

35. The device of claim 26, wherein said light source of said focused illuminated guide is selected from the group consisting of at least one LED, at least one laser diode, at least one electroluminescent lamp, at least one light pipe, and combinations thereof.

* * * * *